United States Patent [19]

Kawabata et al.

[11] Patent Number: 5,694,554
[45] Date of Patent: Dec. 2, 1997

[54] ATM INTERFACE AND SHAPING METHOD

[75] Inventors: Kaori Kawabata; Tatsuo Mochinaga, both of Yokohama; Akihiko Takase, Tokyo, all of Japan

[73] Assignee: Hitachi, Ltd., Tokyo, Japan

[21] Appl. No.: 521,994

[22] Filed: Aug. 31, 1995

[30] Foreign Application Priority Data

Sep. 2, 1994 [JP] Japan .................. 6-209558

[51] Int. Cl.[6] .................. H04L 12/56; H04J 3/02
[52] U.S. Cl. .................. 395/250; 370/392; 370/397; 370/399
[58] Field of Search .................. 395/250; 370/231, 370/397, 399, 392

[56] References Cited

U.S. PATENT DOCUMENTS

| 5,323,389 | 6/1994 | Bitz | 370/397 |
| 5,479,401 | 12/1995 | Bitz | 370/397 |
| 5,483,525 | 1/1996 | Song et al. | 370/392 |
| 5,519,707 | 5/1996 | Subramanian | 370/399 |

*Primary Examiner*—Krisna Lim
*Attorney, Agent, or Firm*—Antonelli, Terry, Stout & Kraus, LLP.

[57] ABSTRACT

In a shaping method of controlling interval of transmission of cells to a transmission path, an input cell is temporarily accumulated in a buffer memory such that transmission time of the input cell is decided according to a traffic condition beforehand registered for each VPI and a traffic condition registered in advance for each VPI/VCI. The conditions are stored in a parameter table. The transmission time is compared with transmission time assigned to each of the preceding cells accumulated in the buffer memory. If conflict occurs therebetween, the transmission time is corrected and then correspondence between the transmission time and identifying information of the input cell are stored in an output control memory. Referring to the memory, the cells are read from the buffer memory in the sequence of transmission time to be sent to an output communication line.

22 Claims, 12 Drawing Sheets

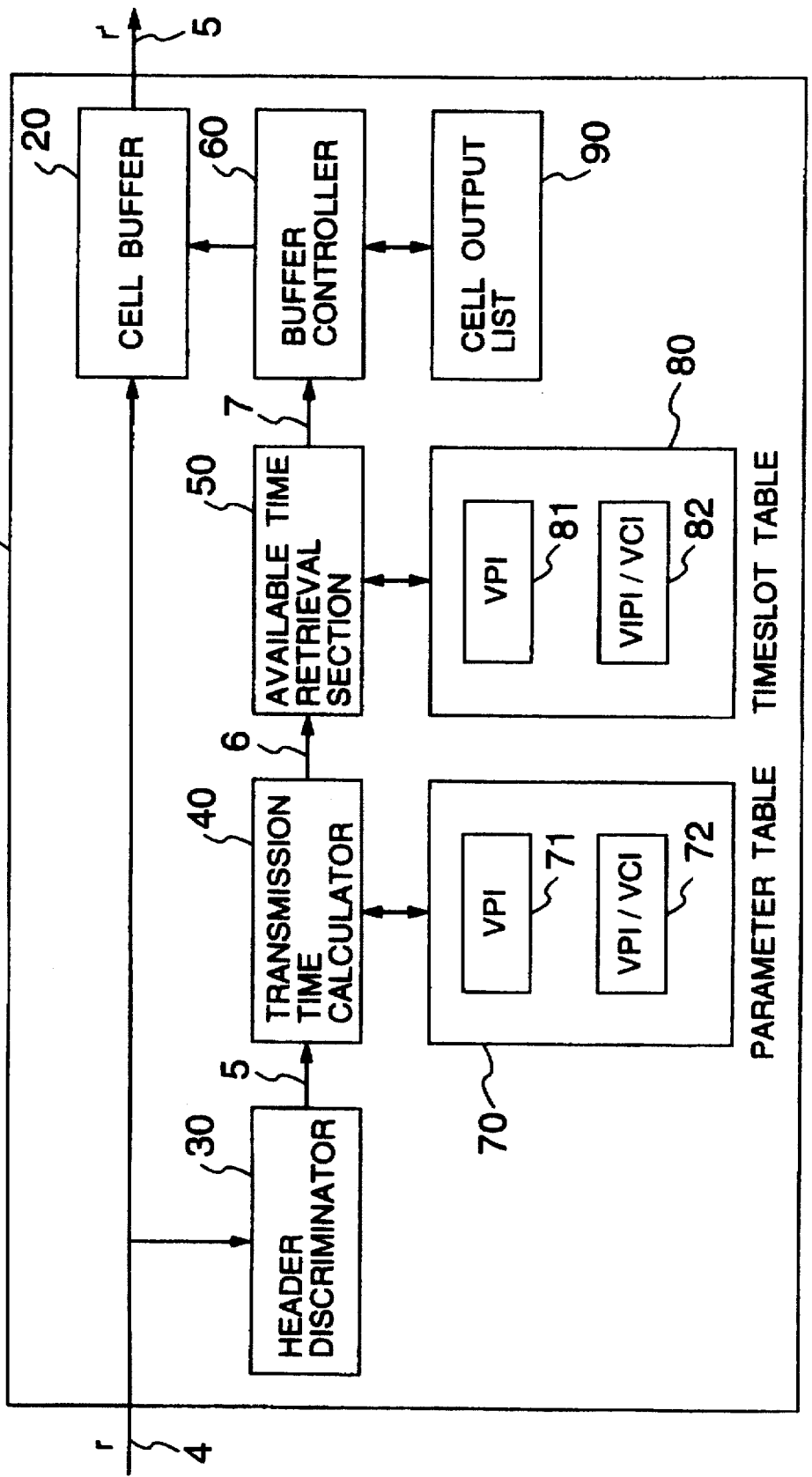

ATM INTERFACE

ATM INTERFACE

FIG.6

70 PARAMETER TABLE

71

| VPI | PEAK CELL INTERVAL |
|---|---|
| 1 | T1 (=r'/r'1) |
| ... | ... |
| A | TA (=r'/r'A) |
| ... | ... |
| N | TN (=r'/r'N) |

72

| VPI/VCI | PEAK CELL INTERVAL | IDEAL TRANSMISSION TIME |
|---|---|---|
| (1) | T(1) (=r'VP(1)/P(1)) | t n(1) |
| ... | ... | ... |
| (a) | T(a) (=r'VP(a)/P(a)) | t n(a) |
| ... | ... | ... |
| (m) | T(m) (=r'VP(m)/P(m)) | t n(m) |

ATM INTERFACE AND SHAPING METHOD

BACKGROUND OF THE INVENTION

1. Field of the Invention

The present invention relates to an interface facility and a method of controlling traffic in an asynchronous transfer mode (ATM) and, in particular, to a shaping technology for controlling transmission of cells according to a declared traffic rate.

2. Description of the Related Art

In a network of an ATM switching system, there is employed a fixed-length packet called "cell" to share network resources among a plurality of connections so as to efficiently achieve a high-speed data transmission. A cell includes, for example, 53 bytes including a five-byte header field and a 48-byte information field. In the header field, there are arranged an identifier of a virtual path (VP), i.e., VPI and an identifier of a virtual channel (VC), i.e., VCI.

In the ATM network, traffic is controlled according to, for example, ITU-T Draft Recommendation I.371 as follows. When a user (originating terminal) issues a call, there are declared traffic parameters, for example, a transmission speed and quality of communication service as traffic information for a call setup by the user. A connection admission control operation is conducted such that resources are allocated to each connection according to the declared parameters and states of input cells are monitored to guarantee quality of communication service. When a transmitted cell is beyond the range of declared traffic, the cell is, for example, marked or discarded according to utilization parameter control (UPC).

To avoid the discarding of cells according to UPC, it is necessary for an ATM interface arranged in a user terminal and/or a user-network interface (UNI) to include a traffic control function, namely, a shaping function to shape each cell so that the cell sent to the ATM network matches the declared traffic condition.

The Recommendation I.371 also proposes a leaky bucket algorithm and a virtual scheduling algorithm as shaping control algorithms applicable to UPC.

Another conventional technology related to traffic control has been described, for example, in the JP-A-5-130136 entitled "Transmission Bit Rate Monitoring Method" in which UPC and shaping are achieved by the configuration of an apparatus shown in FIG. 12 of the publication.

Description will be now given primarily of the shaping function. In the construction of FIG. 12 of JP-A-5-130136, when a cell is transmitted from a user terminal to be delivered via, for example, an ATM multiplexer to an apparatus 500, VCI of the input cell is identified by a header identifying section 501 such that the VCI is notified to a time calculator 502 and the cell is passed to a memory 503. To observe the traffic declared in advance for each VCI, the time calculator 502 calculates a period of wait time D for the cell in the storage 503. When the wait time D lapses, the associated input cell accumulated in the memory 503 is read therefrom in response to an indication from the time calculator 502 and is then sent to an output line r.

However, each exchange arranged in the ATM network carries out link capacity management for each VP. Consequently, when each user accesses a public or leased ATM network, it is necessary to declare traffic of each VPI in addition to traffic of each VCI.

In the conventional shaping control procedure, however, the cell output control operation is accomplished according to traffic declared for each VCI. Consequently, in case where, for example, traffic information declared for each VPI includes a peak cell rate less than the output interface rate, even when the transmission of cells is achieved according to traffic for each VCI, the cell transmission interval exceeds the declared peak cell rate when cells are observed for each VPI. Resultantly, the transmitting operation may possibly exceed the declared traffic in some cases.

FIG. 13 shows an example of cell transmission interval in a conventional shaping control operation.

In this diagram, TA indicates a declared peak interval of a virtual path associated with VPI=A, whereas T(a) and T(b) denote declared peak intervals respectively of virtual channels respectively related to VCI=a and VCI=b formed on the virtual path. Moreover, reference numerals 601 and 602 stand for cells belonging to the virtual channel of VCI=a and numerals 611 and 612 represent cells on a virtual channel of VCI=b.

In the example of FIG. 13, the transmission interval between the cells 601 and 602 and that between the cells 611 and 612 satisfy conditions indicated by the declared values T(a) and T(b), respectively. However, when the cell interval is observed between the cells of VPI=A for each virtual path, the interval between the cells 601 and 602 exceeds the declared peak interval TA.

SUMMARY OF THE INVENTION

It is therefore an object of the present invention to provide a shaping method and an ATM interface each having improved function in an ATM network including a plurality of virtual channels on a virtual path.

Another object of the present invention is to provide a shaping method and an ATM interface capable of satisfying declared traffic with respect to each VPI and each VCI.

Still another object of the present invention is to provide a shaping method and an ATM interface in an ATM interface facility applied to a network in which a plurality of virtual paths are multiplexed on a physical communication line and/or an ATM interface facility handling an input cell having a peak rate declared for each VPI less than a transmission rate of an output line, the shaping method and an ATM interface being capable of controlling the cell transmission interval according to traffic declared for each VPI/VIC and traffic rate declared for VPI.

In order to achieve the objects above according to the present invention, there is provided a shaping method of controlling an interval between cells transmitted to a transmission path including a first step of temporarily accumulating an input cell in a buffer memory and deciding a transmission time of the input cell according to a traffic condition beforehand declared in association with an identifier of a group to which the input cell belongs and a traffic condition beforehand declared in association with an identifier of a subgroup to which the input cell belongs, a second step of comparing the transmission time of the input cell with transmission time already assigned to each of input cells preceding the input cell, correcting, when the compared items are equal to each other, the transmission time decided in the first step, and memorizing a correspondence between the transmission time and identifying information of the input cell, and a third step of reading the cells from the buffer memory in a sequence of transmission time and transmitting the cells to an output communication line.

Furthermore, according to the present invention, there is provided an ATM interface including a buffer memory for temporarily accumulating a plurality of ATM cells supplied via an input line and control means for writing the cells in the buffer memory and reading the cells therefrom and transferring the cells to the output line. The control means includes first table means for storing therein a control parameter obtained in association with a traffic condition beforehand declared for each group and each subgroup to which the input cells respectively belong, second table means for storing therein available states of timeslots on the output line, and access means operative when a cell arrives thereat via the input line for obtaining transmission timing of the cell according to control parameters associated with a group and a subgroup of the cell and stored in the first table means, referencing the second table means and deciding an available transmission time slot to be associated with the transmission timing, and reading from the buffer memory the cell according to the timing of the transmission timeslot, thereby transmitting the cell to the output line.

More specifically, the group corresponds to, for example, a virtual path (VP) configured in a multiplexed form on a transmission path and the subgroup corresponds to a virtual channel (VC) constructed in a multiplexed configuration on each virtual path. Additionally, the control parameters stored in the first table means include, for example, a peak cell interval corresponding to a peak cell rate declared for each group (virtual path identifier) and a peak cell interval associated with traffic declared for each subgroup (virtual channel identifier (VCI)).

According to a favorable embodiment of the present invention, the cell arrival time and cell transmission timeslots are controlled in a unit of time required to transfer one cell at an output interface transmission speed. In this case, in the first table means, there are stored the peak cell interval of each group (virtual path identifier (VPI)) in terms of time required to transfer one cell at the output interface speed and the peak cell interval of each group (VPI) in the unit of peak cell interval. Furthermore, at cell arrival, relative cell transmission time is calculated in the unit of VPI peak cell interval according to the control parameters of each subgroup (VCI). The second table means is accordingly referenced to access available transmission timeslots in the idle or available state so as to decide a cell transmission timeslot to be related to the relative cell transmission time.

In accordance with the constitution described above, since the utilization state (or the idle state) is memorized in the second table means for each timeslots of the cells other than the pertinent cell, even when the relative cell transmission time thereof is in conflict with that (timeslot) of a cell belonging to another subgroup in the same group or to another group, it is possible to retard the transmission point of time to avoid the conflict so as to set a new relative cell transmission time for the pertinent cell.

The second table may be constituted with two parts, namely, a first bit map including a plurality of bit positions corresponding to points of time (timeslots) used to store therein the idle state of the relative cell transmission time for each group and a second bit map including a plurality of bit positions to be employed to store therein timeslot idle states, the second bit map being shared among the groups.

In accordance with the present invention, the cell transmission time (timeslot) can be decided according to the parameters declared for each VCI while satisfying the condition of the peak cell interval for each VPI. Consequently, even when a transmission time obtained for a cell according to control parameters conflicts with that of another cell, the transmission timing of the pertinent cell can be selected from the points of time (timeslots) in the idle state while observing the condition of the peak cell interval declared for each VPI. Resultantly, the shaping operation can be achieved for each VPI and each VCI by reading the cell from the buffer memory at the transmission timing.

The foregoing and other objects, advantages, manner of operation and novel features of the present invention will be understood from the following detailed description when read in conjunction with the accompanying drawings.

BRIEF DESCRIPTION OF THE DRAWINGS

FIG. 1 is a block diagram showing the configuration of an embodiment of an ATM interface according to the present invention;

FIG. 6 is a diagram showing the layout of a parameter table of FIG. 1;

DESCRIPTION OF THE PREFERRED EMBODIMENTS

Figure 2A:
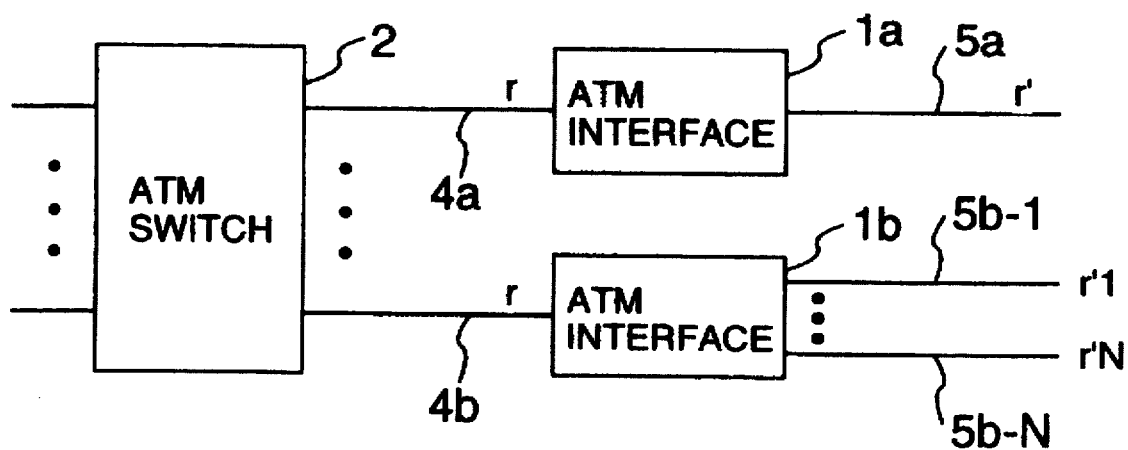
FIGS. 2A and 2B are diagrams showing the system constructions respectively of application examples of the ATM interface according to the present invention.
Figure 2B:
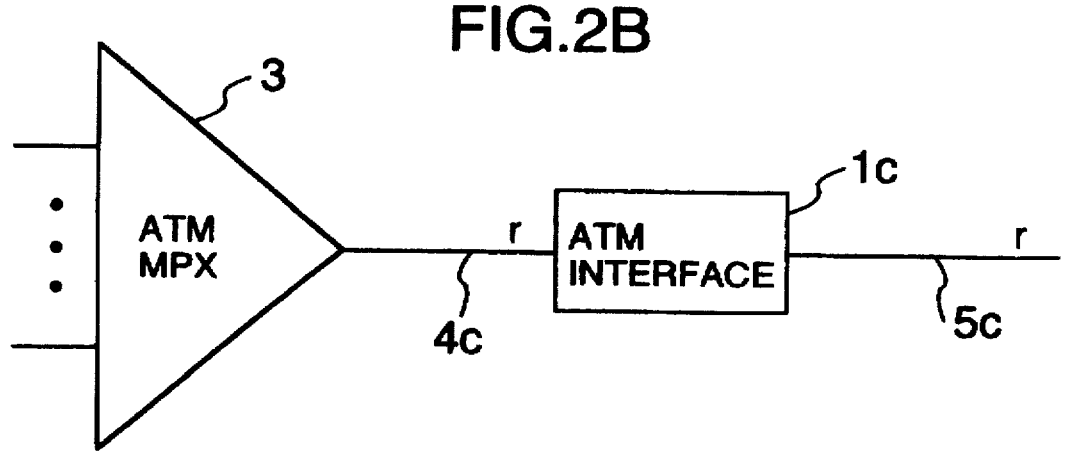

FIGS. 2A and 2B show examples of constitution of communication systems respectively including ATM interfaces 1a and 1b and ATM interface 1C according to the present invention.

In the example of FIG. 2A, the ATM interfaces 1a and 1b are provided between a private branch ATM exchange 2 and a wide area ATM network.

The ATM interface 1a is connected between an output line 4a of the ATM exchange 2 and an input (subscriber) line 5a of the ATM network. The output line 4a has an interface rate r at least equal to an interface rate r' of the ATM network input line 5a. The ATM interface 1a passes to the input line 5a cells which belong to the same virtual path and which are transmitted from the ATM exchange 2 to the output line 4a.

The ATM interface 1b is arranged between an output line 4b of the ATM exchange 2 and a plurality of input lines 5b-1 to 5b-N of the wide area ATM network. The interface 1b receives a plurality of cells which belong to the respectively different virtual paths and which are outputted from the ATM exchange 2 to the output line 4b and then distributively passes the cells to the input lines 5b-1 to 5b-N respectively associated with the virtual paths.

In the example of FIG. 2B, the ATM interface 1c is disposed between an ATM multiplexer 3 in the private branch of the user and the wide area ATM network. The ATM interface 1c receives a plurality of cells which belong to different virtual paths and which are outputted from the multiplexer 3 to the output line 4c and then transfers the cells to an input line 5c of the ATM network. In this case, the output line 4c and the input line 5c of the ATM network have an identical interface rate.

Figure 3A:
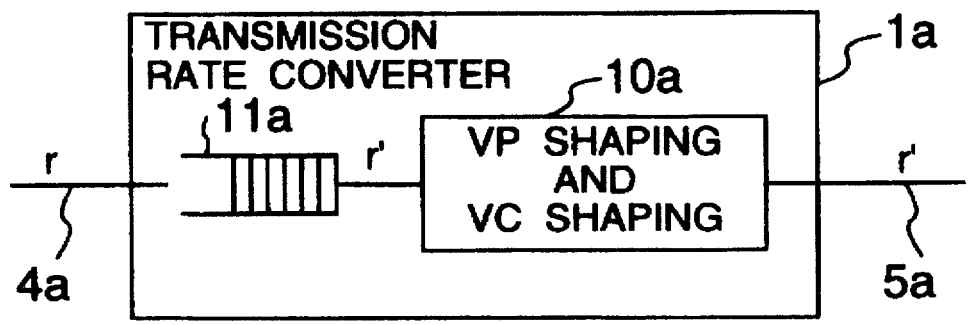
FIGS. 3A and 3B are block diagrams respectively showing the functional configurations of the ATM interface to process cells belonging to an identical virtual path according to the present invention.
Figure 3B:
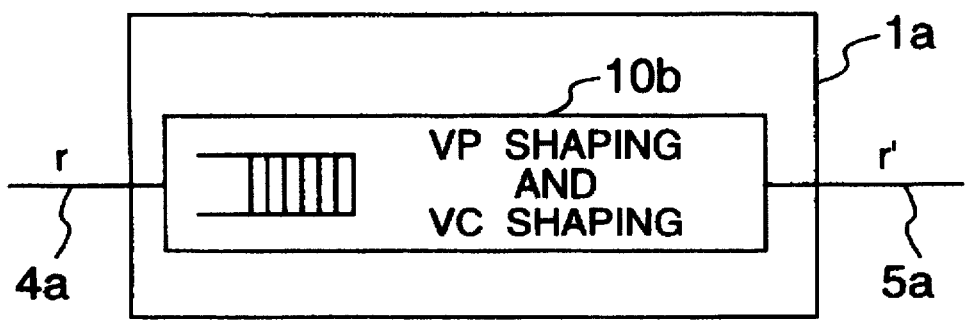

FIGS. 3A and 3B show functional block of the ATM interface to shape cells belonging to the same virtual path.

In the configuration of FIG. 3A, an input cell received at the interface rate r from the line 4a is processed by transmission rate converting means 11a including a buffer memory such as a first-in-first-out storage such that the input cell matches the interface rate r' of the output side. The cell is then shaped by shaping means 10a having a virtual path shaping function associated with a traffic condition declared for each VPI and a virtual channel (VC) shaping function according to a traffic condition declared for each VCI so as to be delivered to the line 5a.

In the structure of FIG. 3B, a shaping circuit 10b includes a buffer memory commonly used for a buffer for transmission rate conversion and a buffer for the VP and VC shaping operations to conduct transmission rate conversion. The cells received via the line 4a are processed by the shaping circuit 10b.

Figure 4A:
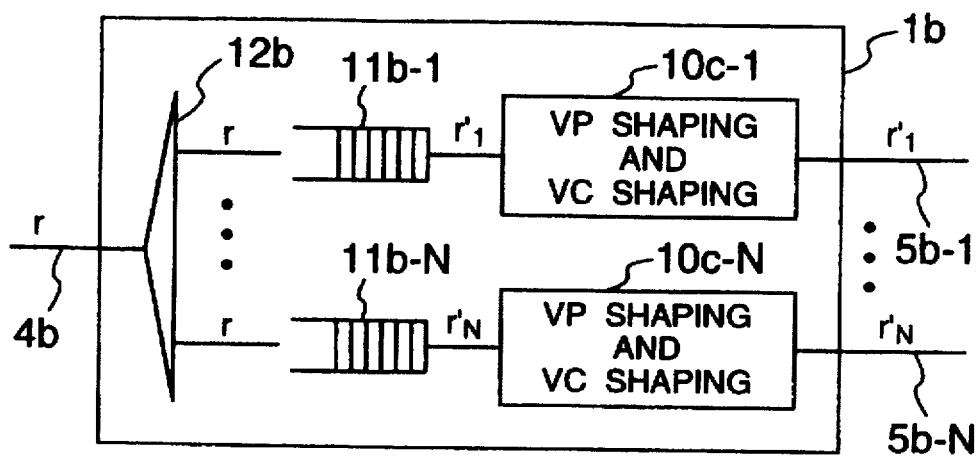
FIGS. 4A to 4C are block diagrams respectively showing the functional configurations of the ATM interface to process a plurality of cells to be passed to a plurality of output communication lines according to the present invention.
Figure 4B:
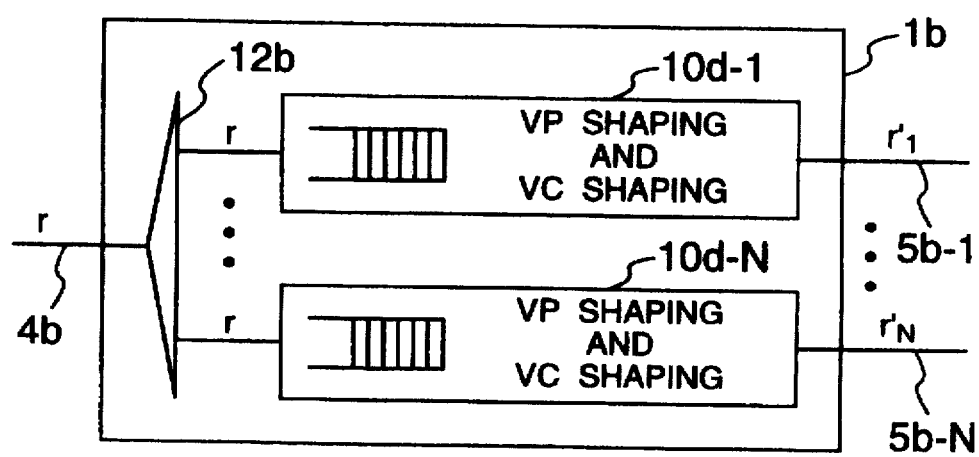
Figure 4C:
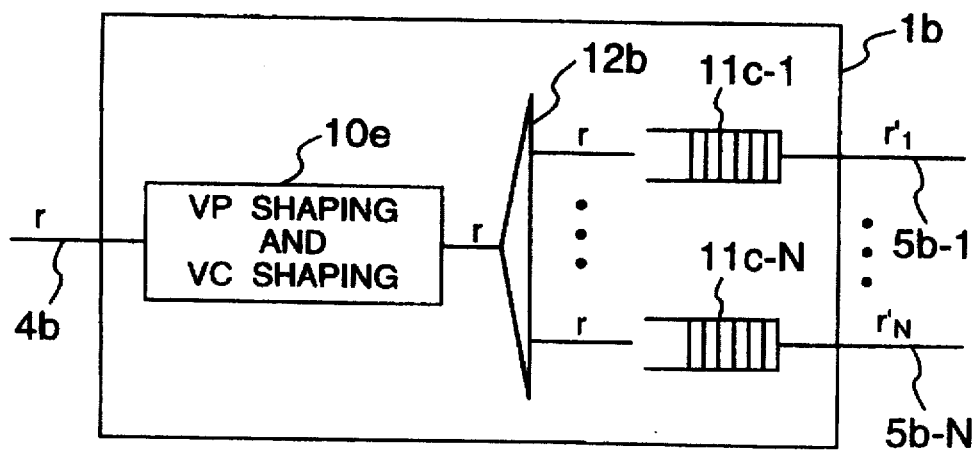

FIGS. 4A to 4C show in block diagrams functions of the ATM interface 1b in which input cells are distributed to a plurality of lines respectively associated with different virtual paths.

In the configuration of FIG. 4A, input cells received at the interface rate r from the line 4b are distributed by a demultiplexer (selector) 12a according to the respective virtual path identifiers (VPIs). The cells are then transformed by transmission rate converters 11b-1 to 11b-N respectively associated therewith such that the cells match transmission rates r'1 to r'N, respectively. The resultant cells are subjected to VC shaping and VP shaping respectively through shaping circuits 10c-1 to 10c-N to be delivered to the lines 5b-1 to 5b-N, respectively.

In the circuit structure shown in FIG. 4B, cells distributed to the associated VPIs by the demultiplexer 12b are supplied respectively to shaping circuits 10d-1 to 10d-N. The rate conversion as well as VP and VC shaping operations are simultaneously conducted for the cells. The obtained cells are fed to the lines 5b-1 to 5b-N related to the respective VPIs.

In the constitution of FIG. 4C, input cells from the line 4b are subjected to VP shaping and VC shaping by a shaping circuit 10e. The resultant cells are distributed by a demultiplexer 12c to the lines 5b-1 to 5b-N respectively associated with VPIs.

Figure 5:
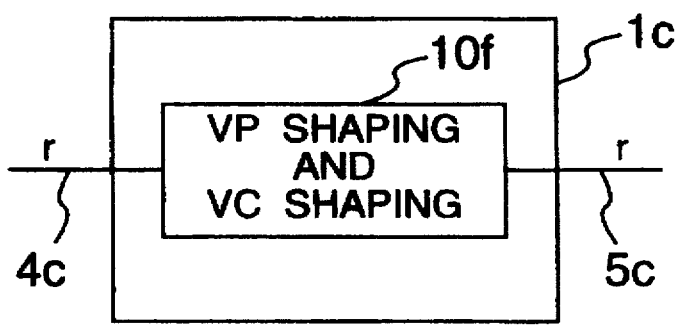
FIG. 5 is a block diagram showing the functional structure of the ATM interface to process a plurality of cells to be sent to one communication line.

FIG. 5 shows a functional block of the ATM interface 1c which receives input cells of plural VPs in the multiplexed form from the line 4c and then multiplexes and transmits the input cells to a line 5c. On this occasion, the cells received from the line 4c are VP shaped and VC shaped by a shaping circuit 10f and are then supplied to the line 5c at the interface rate r of the input circuit 4c.

Subsequently, description will be given of structure of the shaping circuit 10. The configuration of the shaping circuits 10e and 10f processing input cells respectively related to different virtual paths. On the other hand, the constitution of the shaping circuits 10b and 10d which receive input cells related to the same virtual path and that of the shaping circuits 10a and 10c having a separate buffer for transmission rate conversion can be easily understood from the circuit configuration described herebelow and hence description thereof will avoided.

FIG. 1 shows in a block diagram an example of constitution of the shaping circuit 10.

The circuit 10 includes a cell buffer 20 for temporarily accumulating therein a plurality of input cells, a header identifying or discriminating section 30 for identifying a VPI/VCI contained in a header field of each of the input cells, a transmission time calculator 40 for calculating a transmission time (timeslot) of each of the input cells, an available time retrieval section 50 for retrieving an available time (timeslot) associated with the transmission time obtained by the calculator 40, a buffer controller 60 for controlling cell write and read operations in the cell buffer 20, a parameter table 70 for storing therein various parameters such as a traffic condition declared for each connection and a cell transmission time, a timeslot table 80 for storing therein status information indicating states (available/busy) of transmission points of time, and a cell output list 90 for storing therein buffer numbers (addresses) respectively of the cells to be read from the cell buffer 60.

Cells inputted from the line 4 at the interface rate r are sequentially written in the cell buffer 20 to be temporarily accumulated therein. Each cell is kept waiting for the transmission time specified for the cell. When the cell is thus written in the buffer 20, the VPI/VCI contained in the header field of the received cell is identified by the header discriminator 30 to be notified via a bus 5 to the transmission time calculator 40.

For the input cell, the calculator 40 calculates a transmission time according to parameters beforehand stored in the parameter table 70 to form a stream of cells according to the traffic conditions declared respectively for each VPI and each VCI and then sends the result of calculation, namely, transmission time via a bus 6 to the available time retrieval section 50.

The retrieval section 50 references the parameter table 70 to obtain an available time (timeslot) which is a zone of time of the transmission time notified from the calculator or a time zone thereafter and which is available for cell transmission. The detected available time is reported via a bus 7 to the buffer controller 60.

To an entry of the cell output list 90 associated with the available time (timeslot), the controller 60 registers identification information (e.g., a buffer address or a cell buffer number indicating an accumulating position) of the pertinent cell to be sent at the available time. In each timeslot on an output line 5 having the interface rate r', the buffer controller 60 reads from the cell output list 90 information of the cell identifier corresponding to the timeslot. The controller 60 then reads a cell from the cell buffer according to the cell identifying information and thereafter outputs the cell to the line 5.

FIG. 6 shows by way of example the contents the parameter table 70 referenced by the transmission time calculator 40.

The table 70 includes a first parameter table 71 including for each VPI a peak cell interval T expressed in relation to the interface rate r' and a second parameter table 72 including for each VPI/VCI an ideal transmission time tn' and a peak cell interval T' expressed in association with the peak rate of each VPI.

In this example, the cell arrival time is represented in the unit of the period of time necessary to transfer one cell at the interface rate r' on assumption that traffic values (peak cell rates) declared for VPI=1, A, and N are respectively expressed as r'1, r'A, and r'N and those declared for VPI/VCI=1, a, and m are P(1), P(a), and P(m), respectively. In this connection, when all input cells supplied to the shaping circuit 10 have the same VPI, there may be adopted, in place of the first parameter table, a register to store therein one peak cell interval.

Figure 7:
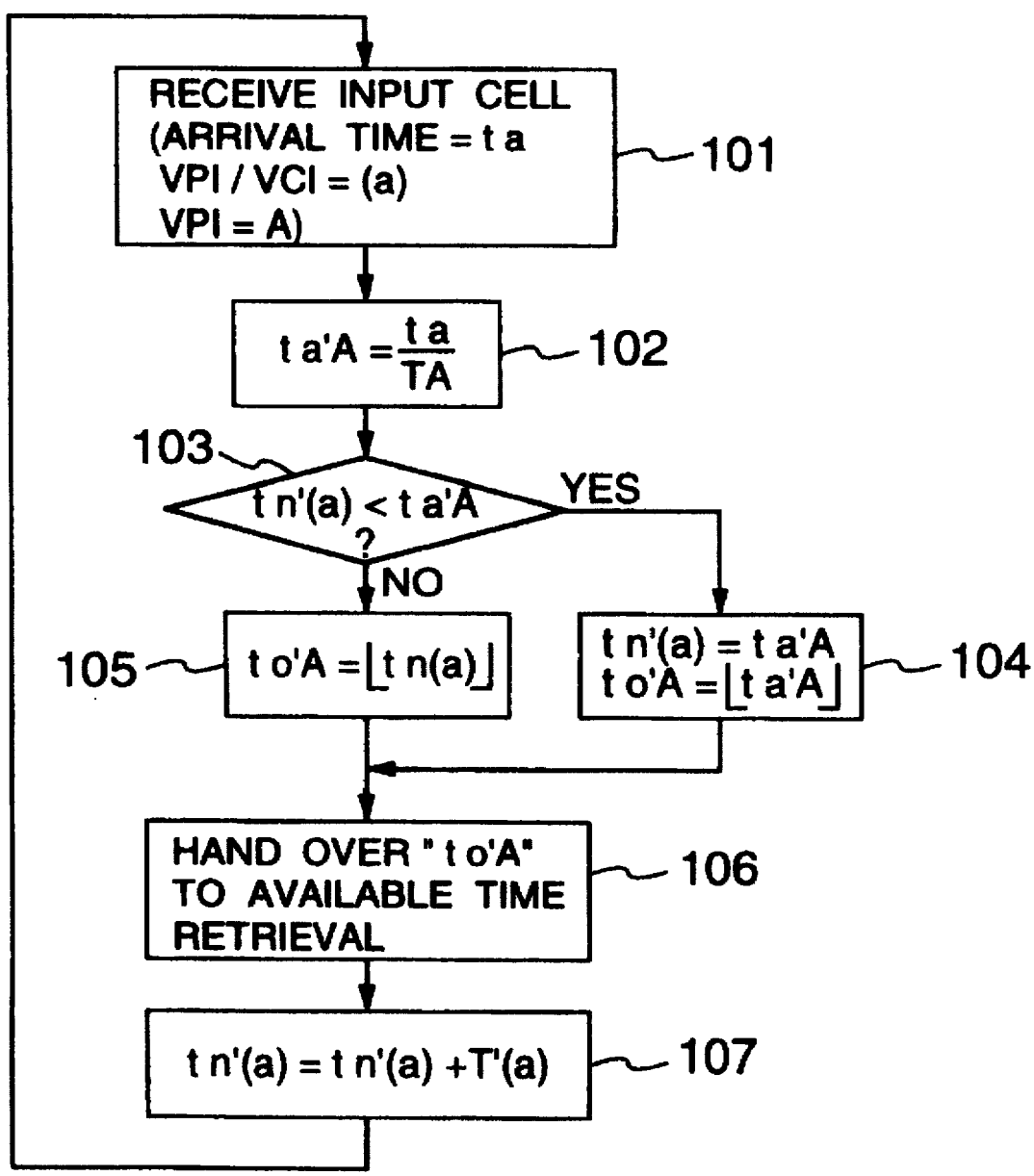
FIG. 7 is a flowchart showing an example of the transmission time calculation conducted in FIG. 1.

FIG. 7 is a flowchart showing the procedure of calculating transmission time with reference to the parameter table.

Assume that the cell arrival time is current time ta indicated by a timer and values respectively of VPI and VPI/VCI notified from the header discriminator 30 are A and (a), respectively. On receiving VPI and VCI from the the header discriminator 30 via the bus 5 (step 101), the transmission time calculator 40 accesses the first parameter table 71 at an address specified by the value A of the received VPI to read therefrom peak cell interval TA for the VPI. To convert the arrival time ta into a value in the unit of cell transmission timing at the peak cell rate, the arrival time ta is divided by TA so as to obtain arrival time ta'A for the control operation (step 102).

Next, the second parameter table 72 is accessed according to an address indicated by VPI/VCI (=(a)) to read therefrom an ideal transmission time tn'(a) associated with the VPI/VCI to be compared with ta'A (step 103). When the ideal transmission time tn'(a) is less than the arrival time ta'A (i.e., tn'(a)<ta'A), the ideal transmission time tn'(a) is set to ta'A. A value obtained by rounding up the fractional part of ta'A is set to the transmission time to'A (step 104). If tn'(a) ta'A), a value obtained by rounding up the fractional part of the ideal transmission time tn'(a) is set to the transmission time to'A (step 105). The value to'A thus determined is reported via the bus 6 to the available time retrieval section 50 (step 106) and then the value of ideal transmission time in the second parameter table 72 is updated to tn'(a)=tn'(a)+T'(a) (step 107).

FIGS. 8A to 8E show an example of the shaping operation based on the transmission time calculation according to the present invention.

Assume here that the peak cell interval TA of VPI (=A) is 3, peak cell intervals respectively of VPI/VCI=(a) and VPI/VCI=(b) belonging to the VPI are respectively set as T'(a)=4 and T'(b)=3, and the initial values 131 and 231 respectively of the ideal transmission time tn(a) and tn(b) are set to 0.

Figure 8:
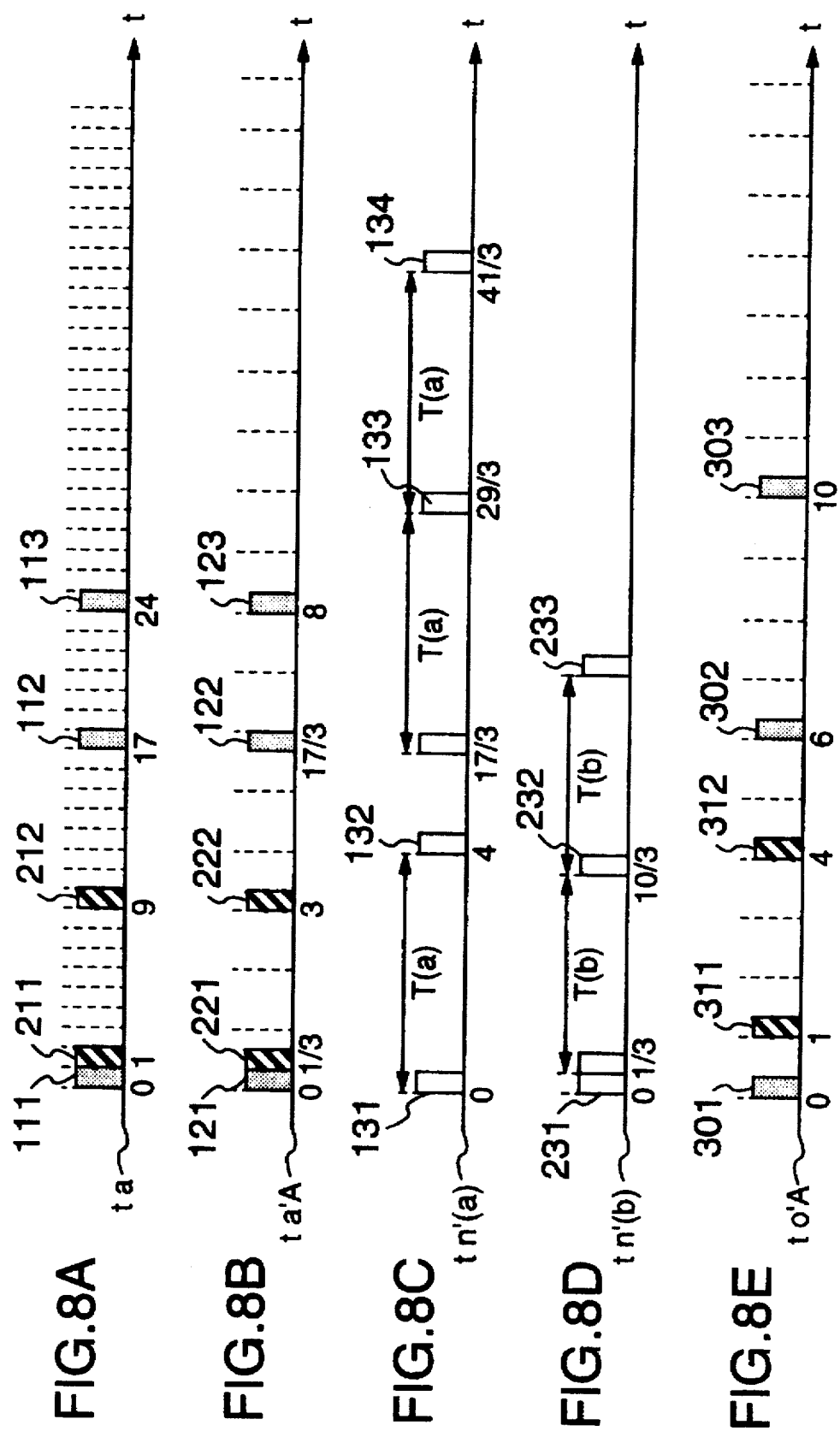
FIGS. 8A to 8E are diagrams for explaining an example of the shaping operation according to the present invention.

As can be seen from FIG. 8A, assuming that the values of arrival time ta respectively of cells 111, 112, and 113 associated with VPI/VCI=(a) are 0, 17, and 24, respectively. Since the value of arrival time ta' for control of the first input cell 111 is 0 as indicated by reference numeral 121 in FIG. 8B, the value of transmission time to'A is 0 as denoted by reference numeral 301 in FIG. 8E. Consequently, the value tn'(a) of ideal transmission time is updated to 4 as designated by numeral 132 in FIG. 8C.

For the next input cell 112 of VPI/VCI=(a), the value of control arrival time ta'A is set to 17/3 as denoted by numeral 122 in FIG. 8B. This value is more than the value "4" of ideal transmission time tn'(a) indicated by numeral 132 in FIG.8C and hence the value of transmission time to'A becomes 6 as designated by numeral 302 in FIG. 8E. In consequence, the value of the next ideal transmission time tn'(a) is updated to 29/3 as denoted by numeral 133 in FIG. 8C.

Moreover, the value of control arrival time ta'A is 8 for the input cell 113 as indicated by numeral 123 in FIG. 8B. This means that the cell has arrived thereat prior to the ideal transmission time 133. The value of transmission time to'A therefore becomes ten as designated by numeral 303 in FIG. 8E. In this situation, the value of ideal transmission time tn'(a) is 41/3 as denoted by numeral 134 in FIG. 8C.

On the other hand, assuming that the values of arrival time ta of cells 211 and 212 of VPI/VCI=(b) are respectively 1 and 9, since the value of control arrival time ta'A of the cell 211 is 1/3 as designated by numeral 221 in FIG. 8B, the value of transmission time to'A becomes one as indicated by numeral 311 in FIG. 8E and hence the value of the next ideal transmission time tn'(b) is updated to 10/3 as indicated by numeral 232 in FIG. 8D. Furthermore, for the next cell 212, the value of control arrival time ta'A is 3 as designated by numeral 222 in FIG. 8B. Since this value is less than the value "10/3" of ideal transmission time 232 shown in FIG. 8D, the value of transmission time to'A becomes 4 as denoted by numeral 312 in FIG. 8E.

According to the values of transmission time to'A obtained in the embodiment above, not only the peak cell interval for each connection, but also the peak cell interval for each VPI satisfies the conditions of declared connections.

Figure 9:
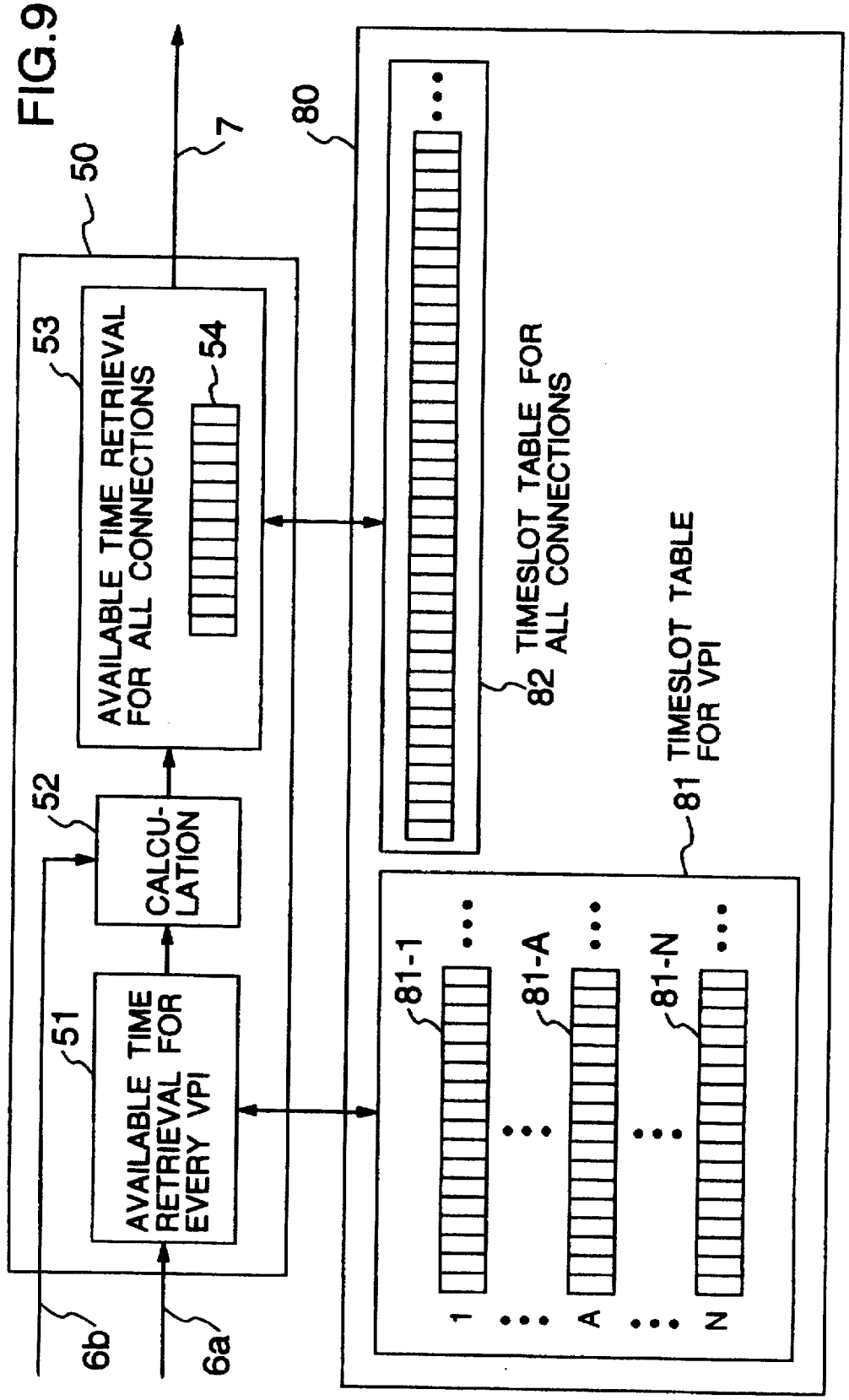
FIG. 9 is a diagram showing an example of constitution of an idle or available time retrieval section and a retrieval table of FIG. 1.

FIG. 9 shows an example of constitution of the available time retrieval section 50 and timeslot table 80.

Numeral 81 indicates a timeslot table for VPI including a plurality of table areas 81-1 to 81-N associated with the respective VPIs. Each area includes a plurality of bit fields corresponding to cell transmission time values (transmission timeslots). For the pertinent VPI, each bit field of the area includes a flag bit to indicate that the associated transmission time is available or busy.

Numeral 82 stands for a timeslot table for all connections including a plurality of bit areas associated with the respective cell transmission timeslots. For the overall connections, each field of the area includes a flag bit indicating that the pertinent transmission time is available or busy. In each of these timeslot tables, when there exists a cell to be transmitted in a timeslot of "transmission time=i", "1" is set to the i-th bit of the table.

In the available time retrieval section 50, when the values respectively of transmission time to'A and peak cell interval TA are received respectively via buses 6a and 6b from the transmission time calculator 40, the table area 81-A of the retrieval table for VPI 81 is accessed by a first retrieval section 51 to make a search through the timeslots beginning at a timeslot at a position related to the transmission time to'A for an available timeslot tgo'A for which the associated flag bit is 0. The retrieved timeslot is notified to a calculating section 52. In this section, the transmission time to (=tgo'A× TA) is calculated on the basis of transmission timeslots according to the time tgo'A. The resultant value is handed over to a second retrieval section 53. In the section 53, the timeslot table for all connections 82 is accessed according to the transmission time to. A retrieval operation is carried out through the timeslots beginning at a timeslot at a position related to time to for an available timeslot tgo in the available state. The attained timeslot is reported to the buffer controller 60.

Incidentally, assume that each bit of the tables is checked beginning at the first position thereof in the retrieval through the table areas 81 and 82 for any flag bits indicating the available state. Since the search operation takes considerably a long period of time when a large number of busy bits exist in the tables, it will be preferable to accomplish a batch retrieval in which several bits of flag information are read therefrom at a time to be checked by, for example, a priority encoder. To further reduce the number of memory accesses in the above operation, there may possibly be employed a status register for each block to indicate by one bit the available or busy state of a table area including several bits. For example, in case where j bits of the memory 82 are treated as one block, when the timeslots are busy in a range of transmission time i to i+j, the i-th and j-th bit positions are set to one in the register 54.

Figure 10:
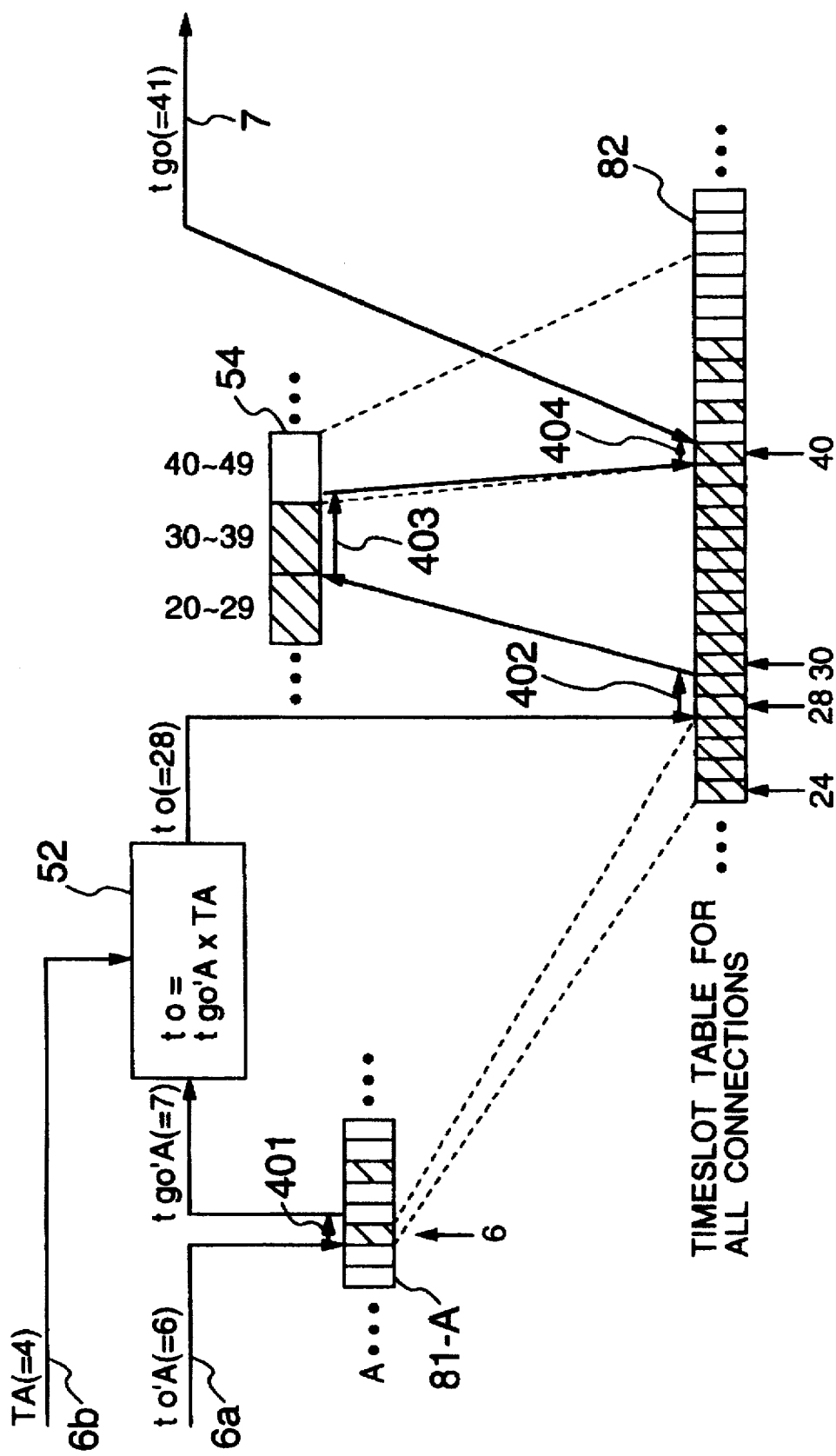
FIG. 10 is a diagram showing an operation example of the idle time retrieval conducted in FIG. 9.

FIG. 10 shows an example of the available timeslot retrieval utilizing the status register for block 54.

When the transmission time is specified as to'A=6 and the value of peak cell interval for VPI is set as TA=4, the retrieval is conducted through the memory 81-A beginning at the 6th bit such that the first bit position i beforehand set to 0 is decided as the real transmission time tgo'A (indicated by an arrow 401). The i-th bit is then set to 1 in the memory 81-A. Assume that the value of tgo'A is, for example, 7. In the calculating section 52, the value "7" is multiplied by the value of TA=4, which leads to a result of to=28.

Next, the retrieval is carried out through the memory 82 beginning at the 28th bit (denoted by an arrow 402). In case where the register 54 memorizes the states respectively of the ten-bit blocks of the memory 82, if there is missing the 0-state bit up to the 29-th bit in the memory 82, the search is carried out through the register 54 beginning at the third (30/10=3) position (indicated by an arrow 403). In the example of FIG. 10, since the fifth bit is 0 in the register 54, the retrieval is accomplished through the memory 82 beginning at the 40th ((5−1)×10=40) bit (denoted by an arrow 404) such that the first available bit position i (41 in this case) is set as tgo and the i-th bit of the memory 82 is set to 1 designating the busy state.

In this regard, when the shaping operation is desired to be exactly carried out for cell delay variation (CDV) associated with the available timeslot retrieval, a value attained by dividing the real transmission time tgo by the peak cell interval TA of VPI is set to the ideal transmission time tn1'(a) of the second parameter table. In the table area 81-A of the first retrieval table 81, the status flag is updated to one at a bit position corresponding to a value obtained by raising the fractional part of the value attained above.

Figure 11:
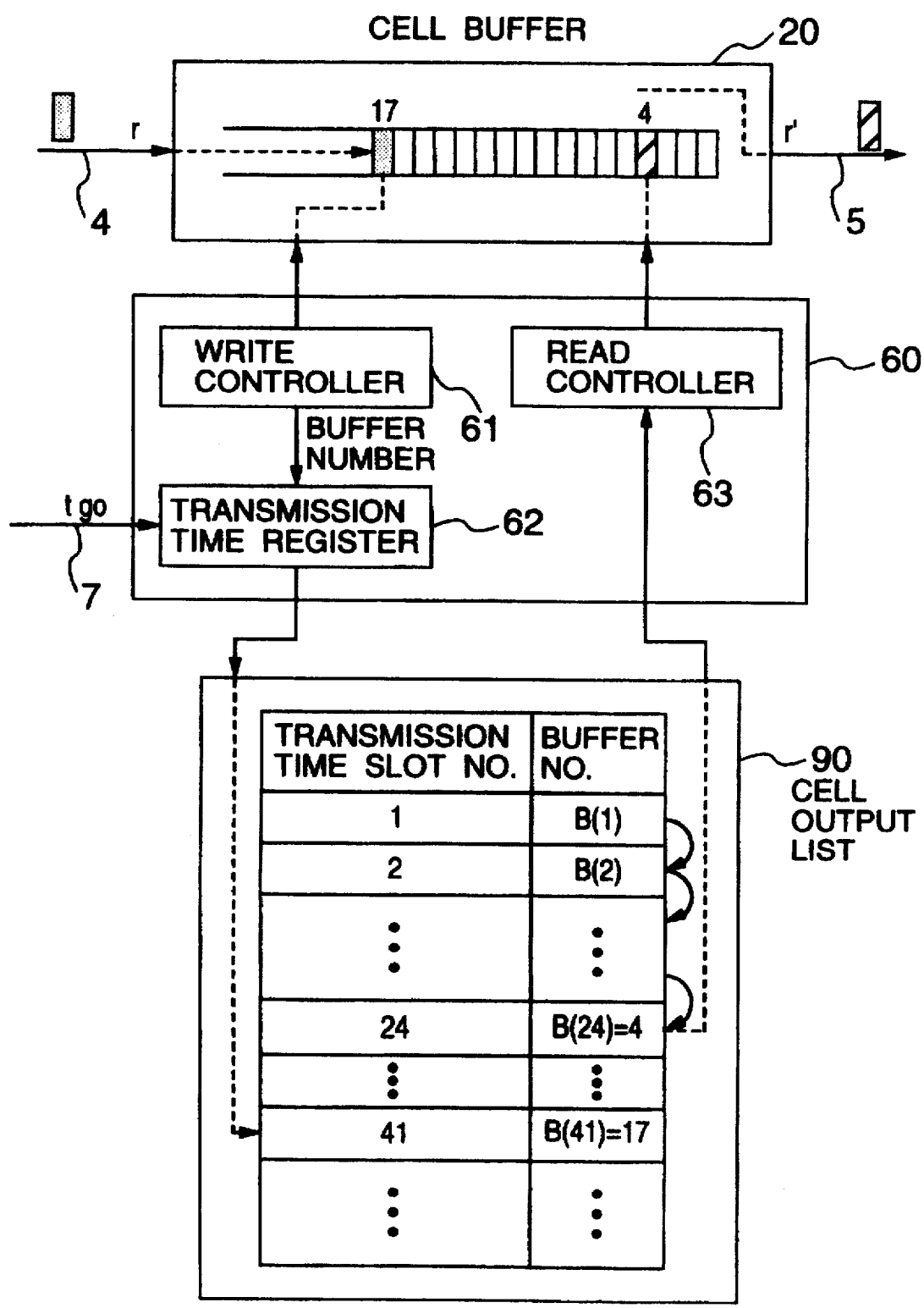
FIG. 11 is a diagram showing an example of structure of cell buffers, a buffer controller, and a cell output list.
Figure 12:
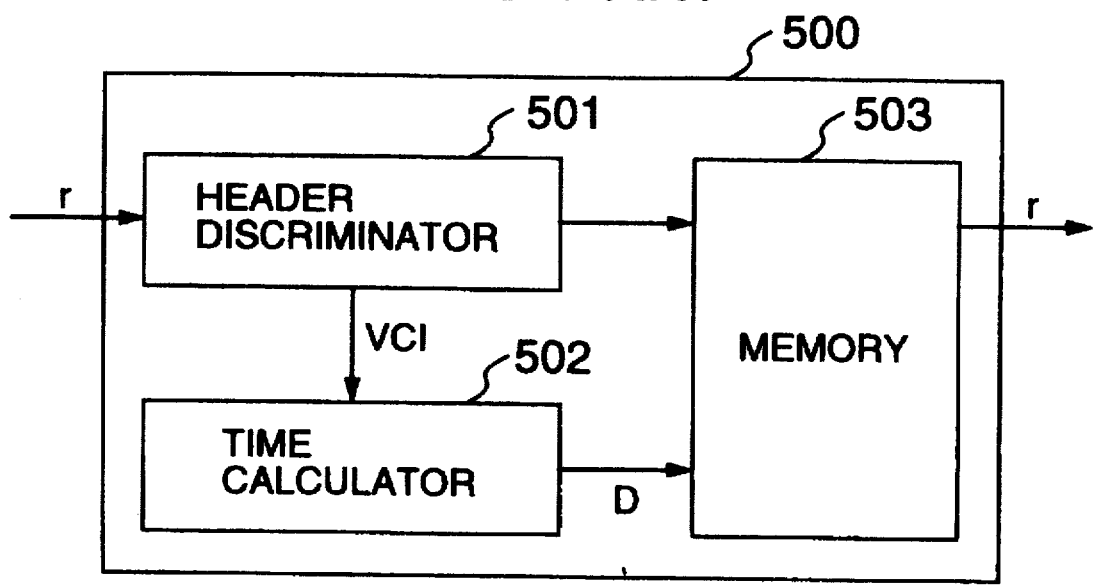
FIG. 12 is a functional block diagram of a conventional shaping circuit.
Figure 13:
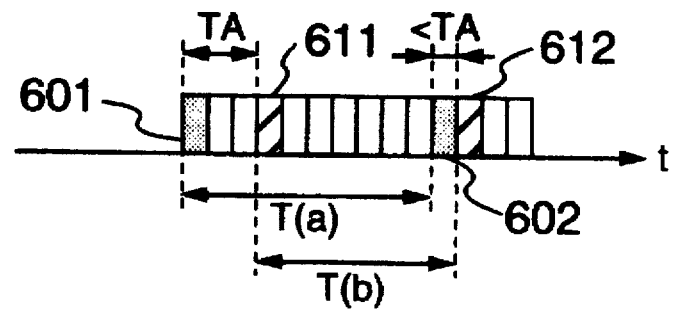
FIG. 13 is a diagram for explaining problems in the conventional shaping circuit.

FIG. 11 shows an example of structure of the cell buffer 20, buffer controller 60, and cell output list 90.

The cell buffer 20 includes a plurality of buffer areas for the respective cells. In the buffer, the data write operation is sequentially conducted, whereas the data read operation is accomplished in a random fashion. The buffer controller 60 includes a write controller 61 for generating a write address of the cell buffer 20, a transmission time register 62 for registering a cell buffer to the cell output list 90, and a read controller 63 for creating a read address of the cell buffer 20. In the cell output list memory 90, buffer numbers are accumulated in association with transmission timeslots.

When an input cell is received from the communication line 4, the write controller 61 produces a sequential write address according to a buffer number supplied from a counter, not shown, so as to write the input cell in the cell buffer 20. The transmission time register 62 stores the write buffer number in an entry area of the cell output list 90, the entry area being associated with time tgo notified via the bus 7 from the available cell retrieval section 50. For example, in case where tgo=41 and write buffer number= 17, buffer number "17" is written in the 41st entry of the cell output list 90.

The read controller 63 reads a buffer number from the cell output list 90 according to the transmission timeslot. (For example, when the transmission time slot is set to 24, buffer number "4" is read from the list 90). A read address is created in relation to the buffer number and then one cell is read from the cell buffer 20 to be sent to the communication line 5.

In the embodiment above, there is prepared a retrieval table indicating the available or busy state of each timeslot in terms of peak cell transmission intervals for each VPI. When there occurs conflict between transmission time values, a retrieval is conducted through the timeslot table for an available timeslot. In consequence, it is possible to appropriately accomplish an exact shaping operation at occurrence of CDV in the conflicting condition.

Figure 14:
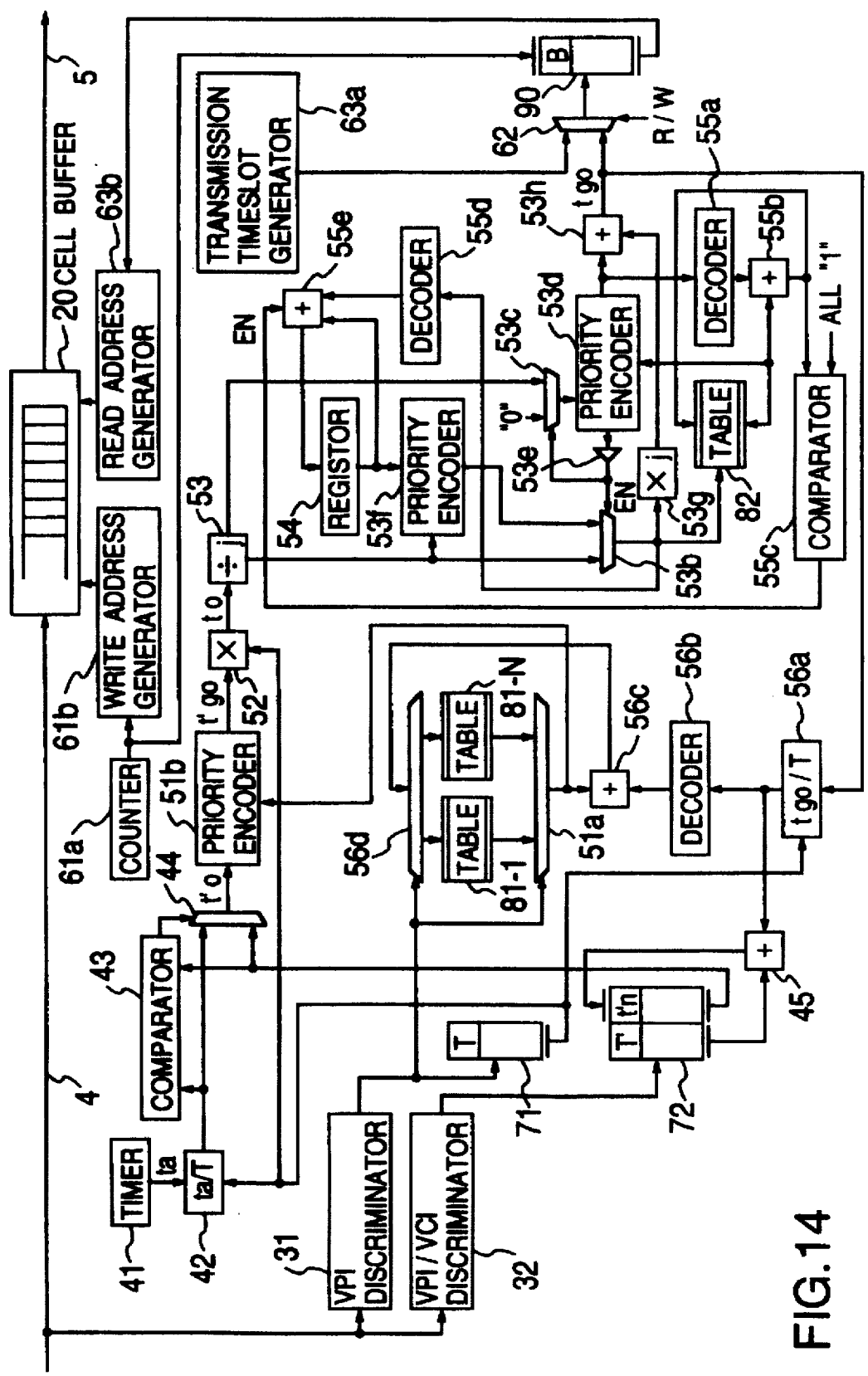
FIG. 14 is a diagram showing an example of the detailed configuration of a shaping circuit of FIG. 1.

FIG. 14 shows a concrete example of structure of the shaping circuit shown in FIG. 1.

In this configuration, a timer 41 indicates a current point of time ta in which a period of one-cell transfer time at the interface rate r of the input line 4 is utilized as one unitary period of time. A transmission timeslot generator 63a creates a transmission timeslot number in terms of one-cell transfer time at the interface rate r' of the output lien 5. A selector 62 conducts a change-over operation between the write address and the read address in response to a read (R) signal and a write (W) signal, respectively.

First, description will be given of the cell receiving operation. When an input cell is received from the line 4, the value of a counter 61a is incremented such that a write address generator 61b creates a write address by using the value of the counter 61a as the write buffer number of the buffer 20, thereby writing the received cell in the buffer 20.

In this operation, a VPI discriminator 31 and a VPI/VCI discriminator 32 respectively identify the values respectively of VPI and VPI/VCI in the header field of the input cell. According to the VPI value decided by the VPI discriminator 31, a peak cell interval T is read from the first parameter table 71. In a divider circuit 42, the cell arrival time ta is divided by the peak cell interval T to attain the control arrival time ta'. Furthermore, in accordance with the value of VPI/VCI supplied from the VPI/VCI discriminator 32, an ideal transmission time tn' is read from the second parameter table 72 to be compared with the arrival time ta' by a comparator 43. If the output from the comparator 43 indicates tn'<ta', the arrival time ta' is selected as the cell transmission time to' by a selector 44. Otherwise (namely, tn'≧ta'), the ideal transmission time tn' is selected as to'.

According to the VPI value delivered from the VPI discriminator, a selection step is conducted through the retrieval tables for VPIs 81-1 to 81-N by a selector 51a according to the VPI value. The contents of the selected table are fed to a priority encoder 51b such that a batch retrieval is effected for the timeslots beginning at a timeslot associated with the cell transmission time to' so as to retrieve an available time timeslot tgo' for which the flag bit is 0. The value of the available time tgo' is multiplied by the peak cell interval T corresponding to the VPI value in a multiplier circuit 52 to attain the transmission time on the basis of the transmission time slot.

The transmission time to is divided in a divider circuit 53a by the number j of bits (slots) of each block of the retrieval table memory for all connections 82. Using as a read address the value of the integer part of to/j outputted from the divider 53a, data is read from the associated block of the memory 82 to be inputted to a priority encoder 53d. The value of remainder from the divider 53a is delivered also to the priority encoder 53d. In the encoder 53, a batch retrieval is carried out for the one-block data obtained from the memory 82 beginning from a bit position indicated by the value of remainder to retrieve an available bit position for which the flag bit is 0. When such an available bit is missing in the data of the block, an enable signal is kept in a latch 53e such that a change-over operation is conducted for the selection inputs in the selectors 53b and 53c, respectively. As a result, a batch retrieval is accomplished by a priority encoder 53f through the block status register 54 beginning at a bit position designated by the integer part of to/j to obtain a bit position for which the flag bit is 0. Using the resultant available bit position as a read address, the table memory 82 is accessed to read therefrom data of the next block such that the retrieval for an available bit position is again carried out for the data by the priority encoder 53d.

When an available bit position is determined by the priority encoder 53d in the operation above, the value of the available bit position is fed to an adder 53h to be added to a value attained by multiplying j by a read address of the memory 82 obtained by a multiplier 53g, thereby outputting the resultant value as the real transmission time tgo. Using the value of tgo as a write address, a write buffer number indicated by a counter 61a is registered to the cell output list 90.

Additionally, the available bit position decided by the priority encoder 53d is decoded by a decoder 55a such that a flag bit "1" is set by a flag update circuit 55b to the retrieval table for all connection 82 at an address of the bit position. Moreover, a check is made by a comparator 55c to decide whether or not all flag bits of the block including the bit position are "1". If this is the case, a read address of the table 82 is decoded by a decoder 55d such that a flag is updated by a flag update circuit 55e in the register 54 at the bit position related to the block.

The read transmission time tgo supplied from the adder 53h is delivered also to a divider 56a. The value of tgo is divided by the peak cell interval T of VPI to obtain the ideal transmission time tn'. The value of tn' is fed to a decoder 56b such that a bit position corresponding to a value attained by raising the fractional part of the ideal transmission time tn' is inputted to a flag update circuit 56c. In the retrieval table for VPI 81, a flag update operation is carried out in a table associated with the VPI value of the input cell. Furthermore, the value of tn' from the divider 56a is delivered also to the adder circuit 45 to be added to the peak cell interval T' of VPI/VCI, thereby updating the value of ideal transmission time in the second parameter table 72.

Cell transmission is achieved as follows. In each transmission timeslot, a transmission timeslot number is outputted from a transmission timeslot generator 63a. The transmission timeslot number is supplied as a read address via a selector 62 to the cell output list 90. In response thereto, a buffer number assigned to the timeslot is read from the list 90 to be fed to the read address (RA) generator 63b. In the generator 63b, a read address is produced according to the buffer number. As a result, a cell is read from the buffer 20 to be sent to the line 5.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A shaping method of controlling an interval between cells transmitted to a transmission path, comprising:

a first step of temporarily accumulating an input cell in a buffer memory and deciding a transmission time of the input cell according to a traffic condition beforehand declared in association with an identifier of a group to which the input cell belongs and a traffic condition beforehand declared in association with an identifier of a subgroup to which the input cell belongs;

a second step of comparing the transmission time of the input cell with transmission time already assigned to each of input cells preceding the input cell, correcting, when the compared items are equal to each other, the transmission time decided in the first step, and memorizing a correspondence between the transmission time and identifying information of the input cell; and a third step of reading the cells from the buffer memory in a sequence of transmission time and transmitting the cells to an output communication line.

2. A shaping method according to claim 1, wherein the traffic conditions respectively corresponding to the group and subgroup identifiers are respectively memorized as peak cell intervals on the output line.

3. A shaping method according to claim 2, wherein the transmission time indicates a timeslot defined in a time series in which a one-cell transmission time through the output line is used as one unitary time.

4. A shaping method according to claim 3, wherein the group identifier is an identifier of a virtual path and the subgroup identifier is an identifier of a virtual channel multiplexed on the virtual path.

5. A shaping method of controlling an interval between cells transmitted to a transmission path in association with a group and a subgroup to which each of the cells belongs, comprising:

a first step of setting a first peak cell interval corresponding to a peak rate declared for each group in which a one-cell transfer time determined by an output interface rate is used as one unitary time and memorizing a parameter corresponding to a traffic rate declared for each subgroup;

a second step operative at arrival of a cell of obtaining a relative cell transmission time according to the parameter corresponding to a subgroup to which the cell belongs, the peak cell interval corresponding to the cell being employed as one unitary time;

a third step of deciding a cell transmission time according to the relative cell transmission time in which a one-cell transfer time determined by the output interface rate is adopted as one unitary time; and a fourth step of transmitting the cell according to the cell transmission time.

6. A shaping method according to claim 5, wherein:

the parameter includes a second peak cell interval corresponding to the peak rate declared for the subgroup; and the second step includes obtaining the cell arrival time in which the first peak cell interval of the group of the arrived cell belongs is utilized as one unitary time and deciding the relative cell transmission time according to the second peak cell interval and a transmission time of a cell which belongs to a subgroup of the arrived cell and which immediately precedes the arrived cell.

7. A shaping method according to claim 5, wherein the second step includes obtaining, when the relative cell transmission time conflicts with that of a cell belonging to another subgroup in the group, a relative cell transmission time in an available state appearing after the conflicting relative cell transmission time of the cell.

8. A shaping method according to claim 5, wherein the second step includes obtaining, when the relative cell transmission time conflicts with that of a cell belonging to another subgroup in the group, another relative cell transmission time which appears after the conflicting relative cell transmission time of the cell and which is not in conflict with another cell in the pertinent group and obtaining, when a cell transmission time decided for the new relative cell transmission time is in conflict with a transmission time of a cell belonging to another group, another available cell transmission time appearing after the cell transmission time.

9. A shaping method according to claim 5, further including the steps of:

storing an available state of each relative cell transmission time for each group in a first bit map including a plurality of bit positions respectively corresponding to points of time and storing an available state of each cell transmission time in a second bit map including a plurality of bit positions respectively corresponding to points of time;

referencing, when conflict occurs for a relative cell transmission time of a cell, the first bit map associated with a group to which the cell belongs and conducting retrieval for an available bit appearing after a bit position corresponding to the relative cell transmission time, thereby deciding as a relative cell transmission time a point of time corresponding to the retrieved bit; and referencing, when conflict occurs for a cell transmission time of a cell, the second bit map and conducting retrieval for an available bit appearing after a bit position corresponding to the cell transmission time, thereby determining as a cell transmission time a point of time corresponding to the retrieved bit.

10. A shaping method according to claim 9, further including the steps of:

providing a register corresponding to the first or second bit map;

grouping, for each bit map, the bits thereof into blocks, each of the blocks including a plurality of bits;

storing a state of each of the blocks in the register;

referencing the register and thereby determining a a reference range of the first or second bit map.

11. A shaping method according to claim 10, further including the steps of:

conducting retrieval for an available time in a predetermined block of the first or second bit map;

referencing the register when there is missing an available time in the block and thereby determining a next reference range of the first or second bit map.

12. A shaping method according to claim 5, wherein the group wherein the group includes virtual buses and the subgroup includes virtual channels provided in a multiplexed form on the virtual buses.

13. A shaping method according to claim 6, wherein the group includes virtual buses and the subgroup includes virtual channels provided in a multiplexed form on the virtual buses.

14. A shaping method according to claim 7, wherein the group includes virtual buses and the subgroup includes virtual channels provided in a multiplexed form on the virtual buses.

15. A shaping method according to claim 8, wherein the group includes virtual buses and the subgroup includes virtual channels provided in a multiplexed form on the virtual buses.

16. A shaping method according to claim 9, wherein the group includes virtual buses and the subgroup includes virtual channels provided in a multiplexed form on the virtual buses.

17. An asynchronous transfer mode (ATM) interface having a shaping function of controlling transmission of ATM cells to an output line according to groups and subgroups to which the cells respectively belong, comprising:

a buffer memory for temporarily accumulating a plurality of ATM cells supplied via an input line; and control means for writing the cells in the buffer memory and reading the cells therefrom and transferring the cells to the output line, wherein the control means includes:

table means for storing therein a first peak cell interval obtained for each group in association with a peak rate declared to the group in which a one-cell transfer time determined according to a cell transmission rate of the output line is used as one unitary time and a control parameter for each subgroup obtained in association with a traffic rate declared for the subgroup in which the first peak cell interval is adopted as one unitary time; and access means operative when a cell arrives thereat via the input line for obtaining a relative cell transmission time according to the control parameter associated with a subgroup of the cell and stored in the table means in which the first peak cell interval corresponding to the cell being employed as one unitary time, deriving a cell transmission time from the relative cell transmission time in which a one-cell transfer time decided according to an interface rate of the output line is utilized as one unitary time, and reading from the buffer memory each of the cells according to the cell transmission time associated therewith, thereby transmitting the cell to the output line.

18. An ATM interface according to claim 17, wherein the access means specifies as the relative cell transmission time and the cell transmission time one of the timeslots decided according to a bandwidth of the output line.

19. An ATM interface according to claim 17, wherein:

the control means includes a memory for storing therein information specifying a cell to be read from the buffer memory with a correspondence established between the information and a timeslot on the output line; and the access means references the memory means and thereby reads a cell corresponding to the timeslot from the buffer memory.

20. An ATM interface according to claim 17, wherein:

the control means includes a first bit map including a plurality of bit positions corresponding to the timeslots for storing therein available states of respective relative cell transmission time for each group and a second bit map including a plurality of bit positions corresponding to the timeslots for storing therein available states of the respective cell transmission time; and the access means include:

means for referencing, when conflict occurs for a relative cell transmission time of a cell, the first bit map associated with a group to which the cell belongs and conducting retrieval for an available bit appearing after a bit position corresponding to the relative cell transmission time, thereby deciding as a relative cell transmission time a point of time corresponding to the retrieved bit; and means for referencing, when conflict occurs for a cell transmission time of a cell, the second bit map and conducting retrieval for an available bit appearing after a bit position corresponding to the cell transmission time, thereby determining as a cell transmission time a point of time corresponding to the retrieved bit.

21. An ATM interface according to claim 20, wherein:

the control means includes a register for storing therein a state of each of a plurality of blocks, each of the blocks including a plurality of bits of the first or second bit map; and the access means references the register and thereby determines a reference range of the first or second bit map.

22. An asynchronous transfer mode (ATM) interface having a shaping function of controlling an interval of transmission of ATM cells to an output line, comprising:

a buffer memory for temporarily accumulating a plurality of ATM cells supplied via an input line; and control means for writing the cells in the buffer memory and reading the cells therefrom and transferring the cells to the output line, wherein the control means includes:

first table means for storing therein a control parameter obtained in association with a traffic condition beforehand declared for each group and each subgroup to which the input cells respectively belong;

second table means for storing therein an available state of each timeslot on the output line; and the access means for obtaining, when a cell arrives thereat from the input line, transmission timing of the cell according to a control parameter which corresponds to a group and a subgroup of the cell and which is stored in the first table means and referencing the second table means for thereby deciding an available transmission timeslot to be associated with the transmission timing, thereby transferring the cell from the buffer memory to the output line at the timing of the transmission timeslot.

* * * * *